United States Patent [19]

Rich, Jr.

[11] 4,141,310

[45] Feb. 27, 1979

[54] POURED FLOOR LEVEL INDICATOR

[76] Inventor: Rodney W. Rich, Jr., P.O. Box 83, Steep Falls, Me. 04085

[21] Appl. No.: 833,225

[22] Filed: Sep. 14, 1977

[51] Int. Cl.² ............................................. G01F 23/00
[52] U.S. Cl. ................................... 33/293; 73/290 R; 116/227
[58] Field of Search ................ 73/290 R; 116/118 R, 116/124 A; 33/293, 296; 52/103

[56] References Cited

U.S. PATENT DOCUMENTS

| 1,191,667 | 7/1916 | Charpentier | 116/118 R |
| 2,699,140 | 1/1955 | Fisher | 33/293 |
| 3,117,378 | 1/1964 | Bowen | 33/293 |
| 3,230,626 | 1/1966 | Berrien | 33/293 |

FOREIGN PATENT DOCUMENTS

| 464477 | 1/1914 | France | 33/293 |
| 3760 of | 1894 | United Kingdom | 33/296 |

Primary Examiner—S. Clement Swisher
Assistant Examiner—Denis E. Corr
Attorney, Agent, or Firm—William Nitkin

[57] ABSTRACT

A device for indicating the level of a poured floor comprised of an outer casing adapted to be driven into the ground, an indicator member receipt shaft which is insertable into the outer casing, and an indicator member having a scale imprinted thereon which is positionable within the indicator member receipt shaft at the height of the floor to be poured and determined by height indicator means.

7 Claims, 3 Drawing Figures

U.S. Patent    Feb. 27, 1979    4,141,310
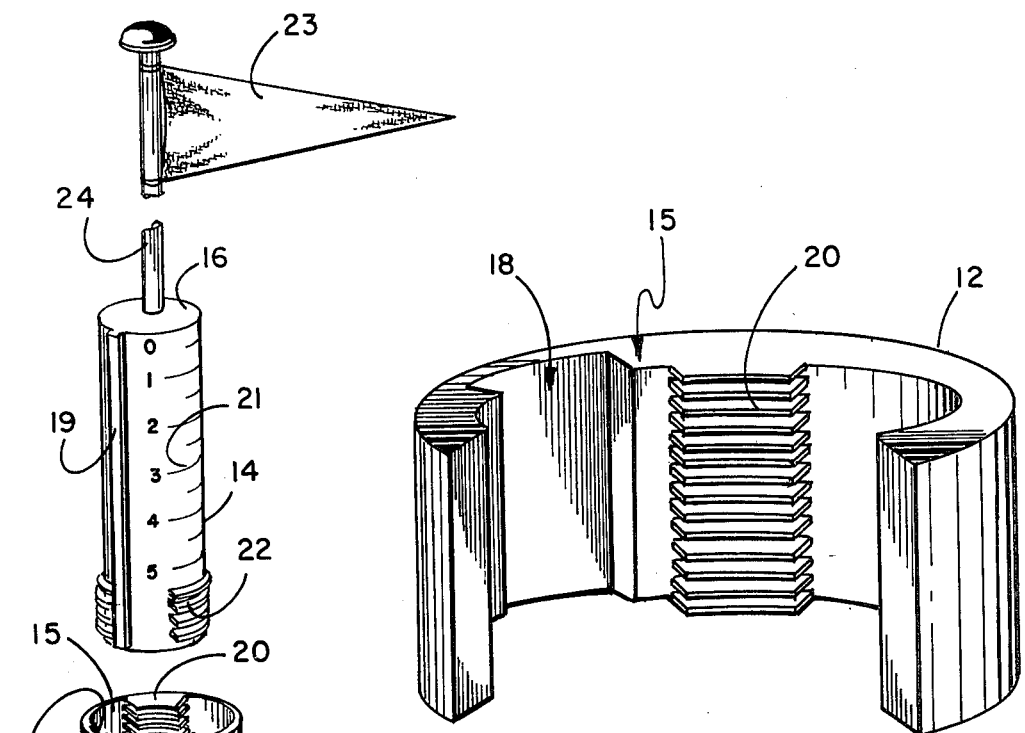
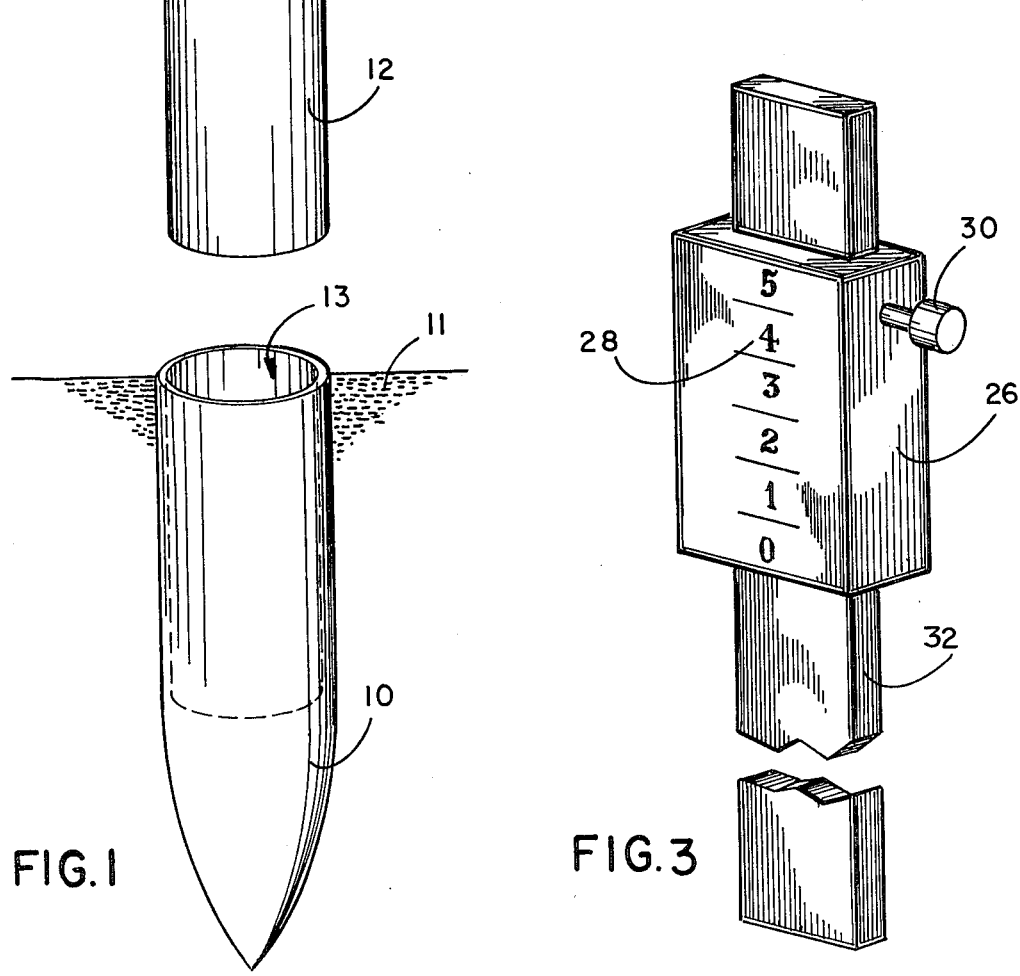

4,141,310

POURED FLOOR LEVEL INDICATOR

BACKGROUND OF THE INVENTION

1. Field of the Invention

The device of this invention relates to measuring devices and more particularly relates to an indicating device for use by concrete finishers to determine the level height of poured floors.

2. Description of the Prior Art

At present, besides the leveling of poured concrete floors by mere sight leveling, a concrete finisher may drive stakes into the ground and try to indicate by measurement on the stakes exactly the height which the concrete flooring is to be poured. Several problems arise with this method. The markings may differ from stake to stake, the stakes may be placed in the ground to different depths, or the ground in different locations may often be at different heights to the level of the floor to be poured. Further in practice these markers are often lost if they become covered after the concrete is poured and then cannot be easily located.

The device of this invention has been designed to meet a long-standing need in the area of concrete finishing and overcomes the problems encountered in using the aforementioned prior art.

SUMMARY

The device of this invention consists of a structure which is driven into the ground and has within it adjustable indicator means so that it can be adjusted to a plurality of heights for the determination of the height of the concrete floor to be poured. The device also can include the use of complementary surveying means. In practice a portion of the device, being the outer casing, is first driven into the ground usually by a hammer. Into this outer casing is inserted indicator means which can be adjusted to a level which can be determined by a transit based on the bench mark of the floor to be poured. A bench mark is the height of the level floor after pouring. The outer casing can be constructed of metal, very hard plastic, or other equivalent material which can be driven into hard ground without damage and has within it an aperture henceforth referred to as the outer casing aperture for receipt of an indicator member receipt shaft. This indicator member receipt shaft has within it an aperture henceforth referred to as the indicator member receipt shaft aperture and a key slot so that an indicator member can be inserted therein which has a keying member which mates with the key slot so that the indicator member can only face the preselected direction determined by the placement of the indicator member receipt shaft in the outer casing. The indicator member receipt shaft aperture further contains a plurality of projections in at least one column which will mesh with at least one projection on the indicator member. These projections do not extend completely around the circumference of the indicator member receipt shaft or indicator member but are only on portions thereof allowing the indicator member to be inserted into the indicator member receipt shaft aperture a desired distance after the key has been mated into one end of the key slot and then to be twisted into position thereby mating the indicator member projection(s) with the indicator member receipt shaft projections. The indicator member further contains within its body a marker which can consist of a rod-like sleeve member which is extendible in an upward direction, and which marker can have a small flag on top to assist in the device's location after the concrete has been poured since the concrete may in some areas extend over the desired bench mark level and have to be worked so that it is eventually positioned in its final level for setting up. On the indicator member is at least one scale which can be calibrated in either inches, metrics, or other scale for use in determining the amount of extension the indicator member is to protrude out of the indicator member receipt shaft aperture which can be determined with a transit and an indicator setting post as described below. The indicator setting post can be similar to the standard post used in surveying which has numbers thereon, but which further includes a slide member having a scale similar to that on the indicator member with a zero point. This slide member on the indicator setting post is utilized with a transit which is in a fixed position and after the indicator setting post is first set at the bench mark, the slide member is adjusted so that when one observes the slide member through the transit, the slide member reads zero. When the indicator setting post is placed at the position of the outer casing at the bottom of the floor area to be poured and is observed through the transit, the number on the scale indicates the number that the indicator member is to be adjusted within the indicator member receipt shaft. For example, if the slide member when read through the transit reads 4 inches, the indicator member is adjusted so that it extends out of the indicator member receipt shaft a length of 4 inches above the level of the ground where the outer casing is driven. Once the indicator member is in position and is twisted to lock it so that it will not be moved, the marker is pulled upwards so that the device can be quickly located once the concrete is poured. In practice several of the devices of this invention can be positioned and set throughout the area of the concrete floor to be poured and are each individually set utilizing the indicator setting post with the prepositioned transit. The concrete is then poured and some of the indicator members may be covered by the concrete, but the markers on the devices will indicate their positions. The concrete is then worked so that it covers the indicator member and is leveled right to the top of each indicator member thereby creating a level floor. Each indicator member can be set at a different height depending on the level of the ground beneath the concrete floor at its position, but the tops of each indicator member, when adjusted by the concrete finisher utilizing an indicator setting post, will all be level with one another. After the concrete has been worked into its final level position, the finisher can break off the markers or bend them into the concrete, or otherwise remove them. It should be noted that the device of this invention will work equally as well with floors to be poured of other non-concrete materials.

BRIEF DESCRIPTION OF THE DRAWINGS

FIG. 1 illustrates an expanded perspective view of the device of this invention.

FIG. 2 illustrates a sectional view of a portion of an indicator member receipt shaft.

FIG. 3 illustrates an indicator setting post.

DESCRIPTION OF THE PREFERRED EMBODIMENT

FIG. 1 illustrates an expanded perspective view of the device of this invention showing outer casing 10 embedded within ground 11. This outer casing must be constructed of a material sufficiently strong to withstand being driven into the ground by a hammer. It can be constructed of metal or of extremely hard plastic or other equivalent material of sufficient strength to accomplish the desired goals. Within outer casing 10 is outer casing aperture 13. Within this aperture is fitted indicator member receipt shaft 12. Indicator member receipt shaft 12 has an indicator member receipt shaft aperture 15 on the inside of which aperture is located key slot 18 and has within one portion of said aperture a plurality of projections 20 of equal distance from one another along the inside preferably in a column. These projections do not extend completely around the periphery of the interior of the indicator member receipt shaft aperture. Within the indicator member receipt shaft aperture is inserted indicator member 14 which has one or more scales 21 thereon as indicated in FIG. 1. On a portion of the indicator member is at least one projection and illustrated in FIG. 1 is a plurality of projections 22 also being on certain sections thereof, spaced apart a distance equal to the spacing of receipt shaft projections 20 within the indicator member receipt shaft. If only one projection is used, its width must fit within the spaces between the indicator member receipt shaft projections when in use. Also on the body of the indicator member is key section 19 for mating with key slot 18 when the indicator member is inserted into the indicator member receipt shaft aperture 15. When the position and height of indicator member 14 has been determined as will be discussed below, the indicator member is inserted into the indicator member receipt shaft aperture so that the very top 16 of the indicator member is level with the floor to be poured. Further, within indicator member 14 is marker 24 to indicate the location of the device of this invention after the concrete has been poured. This marker can consist of an extendible rod-like member affixed to the top 16 of the indicator member or can have a flag-like member 23 mounted thereon. The marker can also have a cap member at the very top for ease of grasping when raising the marker.

FIG. 2 illustrates a sectional view through a portion of the indicator member receipt shaft and receipt shaft projections 20 which are adapted to mesh with projection(s) 22 of the indicator member 14 thereby locking it firmly into its position to indicate the height of the floor at its location on the ground.

It should be noted that the indicator member receipt shaft 12 must fit snugly within outer casing 10 so as to prevent its rotation therein when the indicator member 14 is twisted into its locking position. Key member 19, projection(s) 22 on the indicator member 14, and key slot 18 in the indicator member receipt shaft 12 must be of such a relation that when indicator member 14 is inserted so that its key member 19 is in an edge position within key slot 18, projection(s) 22 of the indicator member will not contact projections 20 of the indicator member receipt shaft 12. But when indicator member 14 is inserted and rotated so that its key member 19 travels within key slot 18 to the opposite end of the key slot, the projections(s) 22 in the indicator member 14 will then mate with projections 20 of the indicator member receipt shaft 12 to lock the indicator member into its desired height position. The size of the projections 20 and 22 and the space therebetween should be small enough to allow for fine adjustment up and down of the indicator member 14 when it is rotated into its locking position, but projections 20 and 22 should be large enough to impart strength to assist in the maintenance in position of the indicator member after it has been locked into position so that it will not be jostled or otherwise moved during the pouring of the concrete or when other activity is being carried on nearby which might tend to make contact with the device of this invention.

It is felt that in one embodiment at least two sets of projections 22 opposite each other on indicator member 14 will assist when engaged with their two sets of mating projections 20 on the indicator receipt shaft 12 in maintaining the indicator member horizontally and securely within the indicator member receipt shaft aperture.

Projections 20 on the inside of the indicator member receipt shaft 12 can extend the complete height in a column of the indicator receipt shaft aperture 15 while the mating projection(s) 22 on the indicator member 14 only need extend a sufficient distance to mesh with the projections along the inside of the indicator member receipt shaft aperture 15 in the desired position.

FIG. 3 illustrates an indicator setting post which is utilized in conjunction with the standard transit. This indicator setting post can consist of post member 32 and slide member 26 positioned thereon. Slide member 26 has imprinted thereon scale 28 starting at zero and going upwards similar to the markings of scale 21 located on indicator member 14. Slide member 26 is first set by placing the base of post member 32 on the bench mark and adjusting the slide member so that a transit in a fixed position will observe the zero line of scale 28. Slide member 26 can be optionally locked in position by set screw 30. Then the indicator setting post is moved to the position of one of the devices of this invention and is again observed through the same fixed positioned transit and the number observed through the transit indicates the depth that the indicator setting post has been dropped. Once that number is known, one can determine the height at which indicator member 14 is to be positioned within the indicator member receipt shaft aperture 15. One then places the indicator member into the indicator member receipt shaft aperture to the scale position as indicated and twists it to lock it into position. The device of this invention at its top 16 now indicates the level of the floor to be poured. Although it is not necessary to use an indicator setting post with the device of this invention since other means could be used to determine the height of the positioning of the indicator member, it has been found that the use of an indicator setting post makes the device of this invention easier to set. Further it should be noted that outer casing 10 is an auxiliary to the basic device as the indicator member receipt shaft 12 itself could be inserted directly into the ground if it were of strong enough construction.

Although the present invention has been described with reference to particular embodiments, it will be apparent to those skilled in the art that variations and modifications can be substituted therefor and especially for the interlocking engagement means without departing from the principles and spirit of the invention.

I claim:
1. A device for indicating the level of poured floors cmprising:
 an indicator member receipt shaft having defined therein an indicator member receipt shaft aperture;
 receipt shaft engagement means located on said indicator receipt shaft within said indicator member receipt shaft aperture;

an indicator member having a top and having imprinted thereon at least one scale;

indicator member engagement means located upon said indicator member and adapted to be engaged with said receipt shaft engagement means when said indicator member is inserted into said indicator member receipt shaft aperture a predetermined distance, said indicator member engagement means being further adapted so as not to protrude beyond the indicator member receipt shaft, said indicator member's top adapted to be at the level of the floor to be poured after said indicator member is inserted into said indicator member receipt shaft said predetermined distance;

said indicator member engagement means further including:
- a key slot defined within said indicator member receipt shaft;
- a key section located on said indicator member adapted to mate with said key slot;
- a plurality of first engagement projections equidistant from one another arranged in a column along the inside of the indicator member receipt shaft within the indicator member receipt shaft aperture; and
- at least one second engagement projection located on said indicator member adapted to mate with said first engagement projections when said indicator member is inserted into said indicator member receipt shaft a predetermined distance and is rotated.

2. The device of claim 1 further including an outer casing member having an aperture defined therein for receipt of said indicator member receipt shaft.

3. The device of claim 1 further including a marker member on said indicator member.

4. The device of claim 1 further including means for determining said predetermined distance for insertion of said indicator member into said indicator member receipt shaft aperture.

5. A device for indicating the level of poured floors comprising:
- an indicator member receipt shaft having defined therein an indicator member receipt shaft aperture;
- receipt shaft engagement means located on said indicator receipt shaft within said indicator member receipt shaft aperture;
- an indicator member having imprinted thereon at least one scale; and
- indicator member engagement means located upon said indicator member and adapted to be engaged with said receipt shaft engagement means when said indicator member is inserted into said indicator member receipt shaft aperture a predetermined distance, further including means for determining said predetermined distance for insertion of said indicator member into said indicator member receipt shaft aperture wherein said means for determining said predetermined distance comprises an indicator setting post having an adjustable slide member thereon, said slide member being imprinted with a like scale to that imprinted upon said indicator member and adjusted in a position upon said indicator setting post whereby when said indicator setting post is located upon the bench mark of the floor to be poured and said slide member is viewed through a transit in a set position, said scale reads zero and upon placement of said indicator setting post at the site of said indicator member receipt shaft, the depth of insertion of the indicator member can be read off said slide member by viewing said slide member through said transit.

6. The device of claim 5 further including an outer casing member having an aperture defined therein for receipt of said indicator member receipt shaft.

7. The device of claim 5 further including a marker member on said indicator member.

* * * * *